(12) United States Patent
Baker et al.

(10) Patent No.: US 7,715,858 B2
(45) Date of Patent: May 11, 2010

(54) SECONDARY STATION AND METHOD OF OPERATING THE STATION

(75) Inventors: Matthew P. J. Baker, Canterbury (GB); Timothy J. Moulsley, Caterham (GB)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 1621 days.

(21) Appl. No.: 09/951,638

(22) Filed: Sep. 13, 2001

(65) Prior Publication Data

US 2002/0034957 A1 Mar. 21, 2002

(30) Foreign Application Priority Data

Sep. 15, 2000 (GB) ................................. 0022633.2

(51) Int. Cl.
*H04B 15/00* (2006.01)
(52) U.S. Cl. .................... 455/506; 455/10; 455/442; 455/522; 324/76.11
(58) Field of Classification Search ... 455/422.1–426.1, 455/436–444, 450–454, 9, 10, 500, 507, 455/509–513, 521, 524, 525, 506, 422, 522; 324/76.11
See application file for complete search history.

(56) References Cited

U.S. PATENT DOCUMENTS

| | | | | |
|---|---|---|---|---|
| 5,056,109 | A | | 10/1991 | Gilhousen et al. ............... 375/1 |
| 5,267,261 | A | | 11/1993 | Blakeney, II et al. ............ 375/1 |
| 5,490,165 | A | * | 2/1996 | Blakeney et al. ............. 370/335 |
| 5,945,948 | A | * | 8/1999 | Buford et al. ................ 342/457 |
| 6,073,021 | A | * | 6/2000 | Kumar et al. ................ 455/442 |
| 6,085,108 | A | * | 7/2000 | Knutsson et al. ............ 455/522 |
| 6,144,861 | A | * | 11/2000 | Sundelin et al. ............. 455/522 |
| 6,324,401 | B1 | * | 11/2001 | De Hoz Garcia-Bellido et al. ............................ 455/442 |
| 6,334,047 | B1 | * | 12/2001 | Andersson et al. ............. 455/69 |
| 6,473,624 | B1 | * | 10/2002 | Corbett et al. ............... 455/522 |
| 6,493,564 | B2 | * | 12/2002 | Longoni et al. .............. 455/522 |
| 6,526,261 | B1 | * | 2/2003 | Takeuchi et al. ............... 455/69 |
| 6,553,016 | B1 | * | 4/2003 | Roxbergh .................... 370/331 |
| 6,570,862 | B2 | * | 5/2003 | Virtanen ..................... 370/335 |
| 6,594,499 | B1 | * | 7/2003 | Andersson et al. ........... 455/522 |
| 6,628,698 | B1 | * | 9/2003 | Oda ............................ 375/147 |
| 6,678,531 | B1 | * | 1/2004 | Salonaho ..................... 455/522 |

(Continued)

FOREIGN PATENT DOCUMENTS

EP 0982879 A1 1/2000

(Continued)

*Primary Examiner*—Patrick N Edouard
*Assistant Examiner*—Justin Y Lee

(57) ABSTRACT

A secondary station has a receiver capable of resolving signals received (504,510) as a plurality of multipath signals from a plurality of base stations during a soft handover process. In order to decode and act upon the received signals in a very short period of time, an initial subset of received multipath signals is processed (506) to provide an estimate of the action needing to be taken by the station, which action is then implemented by the station (508). Later arriving signals are processed separately (512) and used to update the estimate, as a result of which the action already taken may be corrected (514).

Such a secondary station is particularly suitable for decoding and acting upon power control commands included in received signals in a UMTS system, for which a very limited period of time is provided by the UMTS specification.

17 Claims, 3 Drawing Sheets

U.S. PATENT DOCUMENTS

| | | | |
|---|---|---|---|
| 6,690,939 B1* | 2/2004 | Jonsson et al. | 455/453 |
| 6,708,041 B1* | 3/2004 | Butovitsch et al. | 455/522 |
| 6,823,193 B1* | 11/2004 | Persson et al. | 455/522 |
| 6,850,770 B2* | 2/2005 | Hwang | 455/522 |
| 2001/0000168 A1* | 4/2001 | Esmailzadeh et al. | 455/522 |
| 2001/0029169 A1* | 10/2001 | Agin | 455/88 |
| 2001/0053670 A1* | 12/2001 | Voyer | 455/69 |
| 2001/0053695 A1* | 12/2001 | Wallentin | 455/436 |
| 2002/0049057 A1* | 4/2002 | Moulsley et al. | 455/436 |
| 2002/0077141 A1* | 6/2002 | Hwang et al. | 455/522 |
| 2002/0082036 A1* | 6/2002 | Ida et al. | 455/522 |
| 2002/0111184 A1* | 8/2002 | Takano et al. | 455/522 |
| 2002/0115461 A1* | 8/2002 | Shiraki et al. | 455/522 |
| 2003/0171118 A1* | 9/2003 | Miya | 455/442 |
| 2004/0053614 A1* | 3/2004 | Il-Gyu et al. | 455/436 |
| 2004/0087328 A1* | 5/2004 | Ronkainen | 455/522 |
| 2004/0147227 A1* | 7/2004 | Hamalainen et al. | 455/69 |
| 2004/0209618 A1* | 10/2004 | Niemela et al. | 455/445 |
| 2004/0219919 A1* | 11/2004 | Whinnett et al. | 455/442 |
| 2004/0228305 A1* | 11/2004 | Grieco | 370/335 |
| 2004/0235510 A1* | 11/2004 | Elicegui et al. | 455/522 |
| 2004/0248581 A1* | 12/2004 | Seki et al. | 455/450 |
| 2005/0239491 A1* | 10/2005 | Feder et al. | 455/522 |
| 2008/0102878 A1* | 5/2008 | Tiedemann, Jr. | 455/522 |

FOREIGN PATENT DOCUMENTS

| | | |
|---|---|---|
| WO | WO0036762 | 6/2000 |

\* cited by examiner

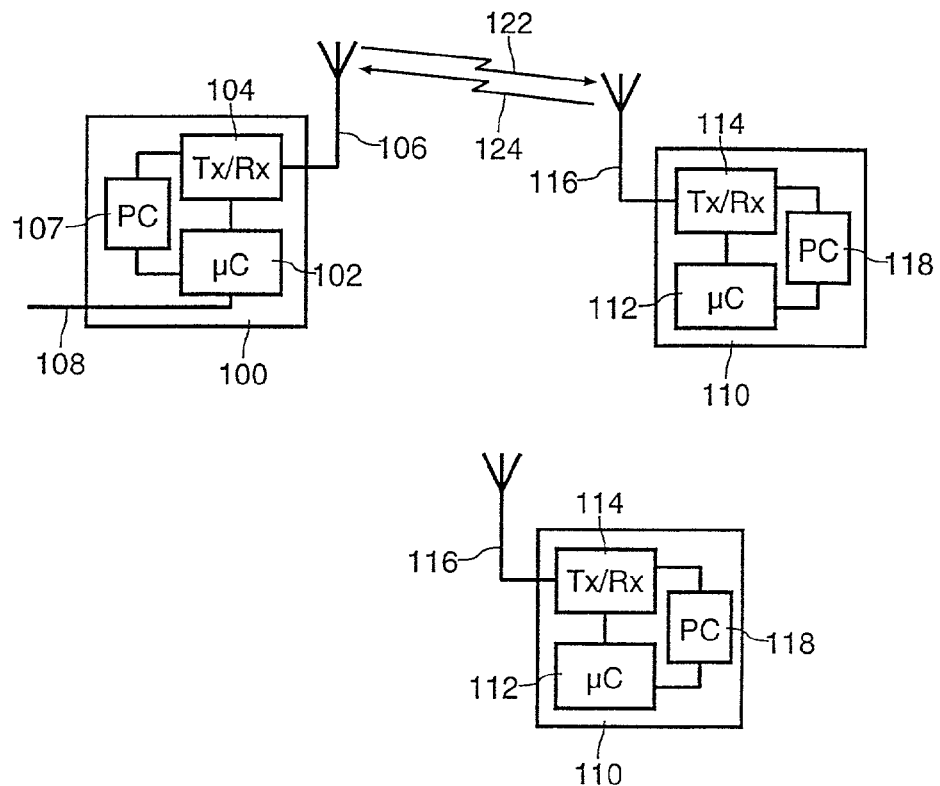
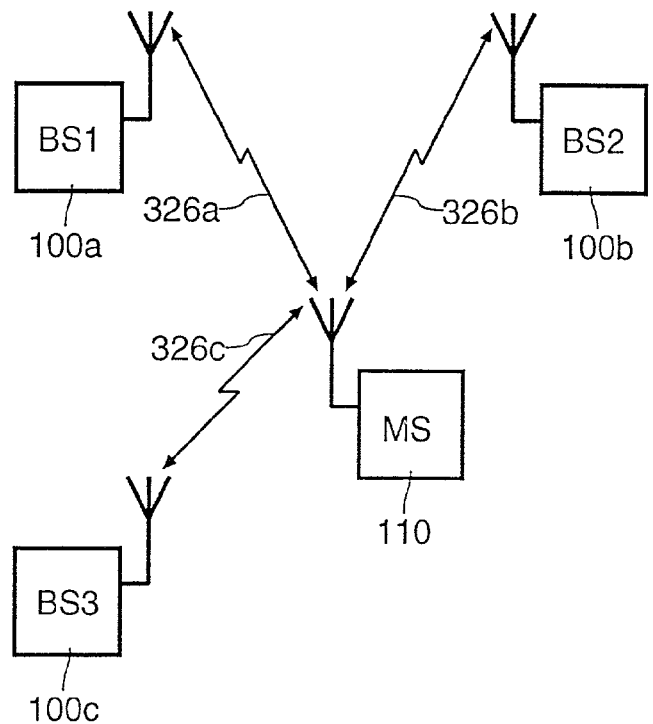
FIG. 1
FIG. 3

SECONDARY STATION AND METHOD OF OPERATING THE STATION

The present invention relates to a secondary station for use in a radio communication system and further relates to a method of operating the secondary station. While the present specification describes a system with particular reference to the emerging Universal Mobile Telecommunication System (UMTS), it is to be understood that the techniques described are equally applicable to use in other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In many radio communication systems accurate power control is important. This is particularly so in systems employing spread spectrum Code Division Multiple Access (CDMA) techniques, because many communication channels share the same bandwidth and so transmission at too high a power in any one channel reduces the signal to noise ratio in all the other channels. Uplink power control, of signals transmitted to a Base Station (BS) from a Mobile Station (MS), is particularly important. It ensures that the BS receives signals from different MSs at approximately the same power level for a given data rate and quality of service, while minimising the transmission power required by each MS. Downlink power control, of signals transmitted by the BS to a MS, is required so that the MS receives signals from the BS with a low error rate while minimising transmission power, to reduce interference with other cells and radio systems.

In a UMTS embodiment, power control is normally operated in a closed loop manner. For uplink power control the BS determines the required changes in the power of transmissions from a MS and signals these changes to the MS by means of Transmit Power Control (TPC) commands. To minimise overheads, a TPC command typically instructs the MS to increase or decrease its power, with the change in power being a step of predetermined size. However, in some systems a TPC command may also determine the step size to be used.

A MS generally communicates with a single BS. During the course of a call the MS may wish to investigate transferring to another BS, for example when the quality of the communication link deteriorates as the MS moves away from its BS, or when the relative traffic loading of different cells requires adjusting. The process of transferring from one BS to another is known as handover. In a version of this process known as soft handover, the MS engages in communication with a plurality of BSs (known as the "active set" of BSs) to determine to which BS, if any, it should transfer. When the MS is engaged in this process it will receive TPC commands from each of the BSs. An example of a strategy for determining what change in power to make based on the received TPC commands is disclosed in International Patent Application WO 00/36762.

A problem with power control during soft handover is that there is a limited amount of time available to receive, decode and process the power control commands. For example, in UMTS there is a period of 416 chips (approximately 108 μs) after the arrival of the first TPC command during which the received commands need to be decoded and processed to determine the magnitude and direction of the required power change. This period is followed by a period of 50 μs during which the transmission power change should be made.

This problem is made worse because in UMTS soft handover there may be a time difference of up to 148 chips (38.5 μs) between the arrival times of the first signals from each BS. When the signal from a BS is received via several downlink paths and the information from the paths is combined (for example using a Rake receiver), a further delay is introduced of up to the worst-case delay spread between paths. In a UMTS system this could reduce the available processing time by up to 20 μs. The combined effect of soft handover and delay spread can therefore be to reduce the available processing time by half. This allows very little flexibility for scheduling of the necessary processing tasks in a receiver, particularly for transceiver architectures having significant processing delay through use of vector processors.

An object of the present invention is therefore to maximise the time available in a MS for processing of power control commands.

According to a first aspect of the present invention there is provided a secondary station for use in a radio communication system comprising a plurality of primary stations, the secondary station having means for engaging in a soft handover process, in which the secondary station communicates simultaneously with at least two primary stations, and receiver means for receiving transmitted signals from the at least two primary stations as a plurality of multipath signals, wherein means are provided for processing an initial subset of the multipath signals to provide an initial estimate of what action should be taken by the secondary station, and for processing multipath signals received after the initial subset to update the estimate.

According to a second aspect of the present invention there is provided a method of operating a secondary station comprising engaging in a soft handover process, in which the secondary station communicates simultaneously with at least two primary stations, receiving transmitted signals from the at least two primary stations as a plurality of multipath signals, processing an initial subset of the received multipath signals to provide an initial estimate of what action should be taken by the secondary station, and processing multipath signals received after the initial subset to update the estimate.

The present invention is based upon the recognition, not present in the prior art, that by making an initial estimate of the required power change before all multipath signals have been processed, improved flexibility in scheduling information processing in a MS is possible.

Embodiments of the present invention will now be described, by way of example, with reference to the accompanying drawings, wherein:

FIG. 1 is a block schematic diagram of a radio communication system;

FIG. 3 is a block schematic diagram of a radio communication system with a MS in the process of soft handover;

In the drawings the same reference numerals have been used to indicate corresponding features.

Figure 2:
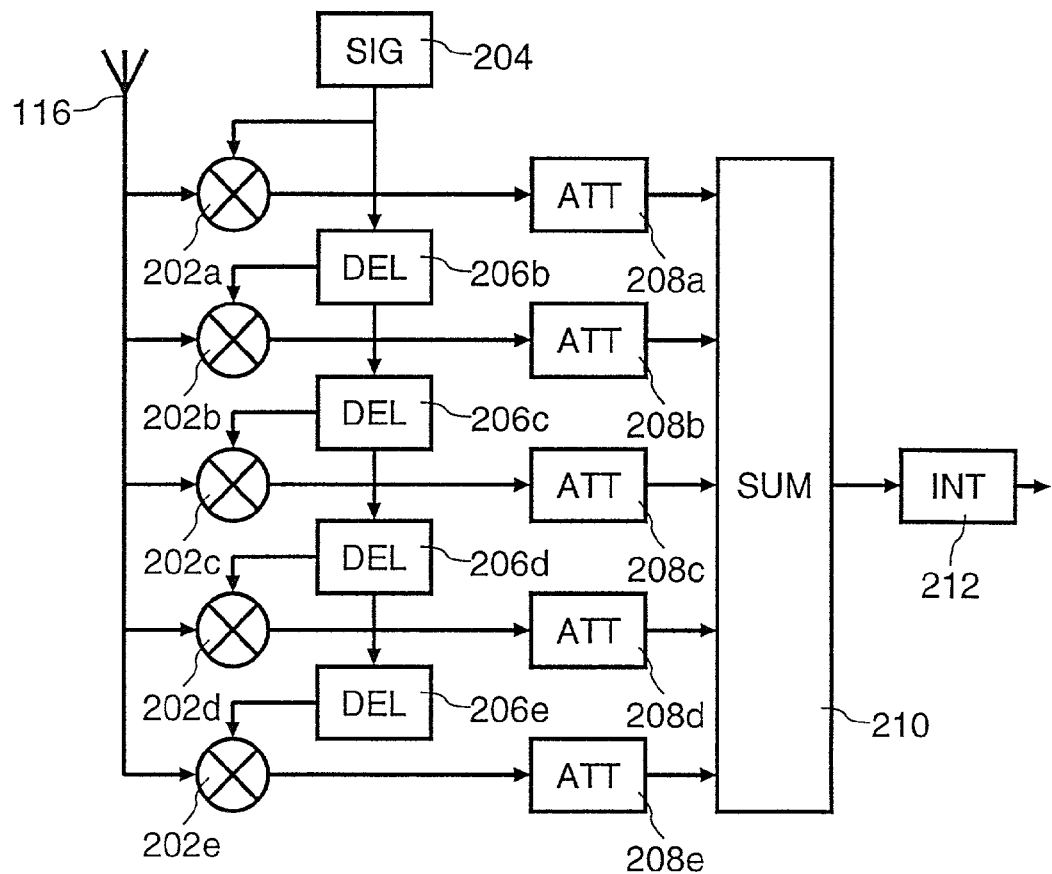
FIG. 2 is a block schematic diagram of a Rake receiver having five fingers.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink frequency channel 122, while communication from MS 110 to BS 100 takes place on an uplink frequency channel 124.

The transceiver means 114 in a MS 110 may include a Rake receiver. Such a receiver, well known to those skilled in the art, is designed to detect a CDMA signal transmitted over a dispersive multipath channel. A block schematic diagram of a five-finger Rake receiver is shown in FIG. 2. Signals received via the antenna 116 are down-converted to baseband and supplied as a first input to five mixers 202. A signal generator (SIG) 204 generates a local copy of a signal encoded with the same spreading code as that used by the BS 100. This signal is supplied as a second input to the first mixer 202a. The same signal, delayed by delay means (DEL) 206b, is supplied as a second input to the second mixer 202b, and similarly to mixers 202c,202d,202e delayed further by delay means 206c, 206d,206e respectively.

By adjusting the phase of the generated signal according to the output of a channel estimator and the delays applied by the delay means 206, five versions of the same transmitted signal received by five different paths having different delays can be handled. The received signals have their amplitudes multiplied by a weight factor proportional to their respective received signal strengths by attenuators (ATT) 208, and are then summed by adding means (SUM) 210. The combined signal is then integrated by integration means (INT) 212 over successive symbol periods to determine the received symbols, which symbols are supplied to the remainder of the receiver for further processing. If signals are received via more than five different paths, the phase of the signal generator 204 and the delays introduced by the delay means 206 are adjusted to match the five strongest received paths (or those with the best signal to interference ratio).

A MS 110 engaged in a soft handover process is illustrated in FIG. 3, the MS 110 having three two-way communication channels 326a,326b,326c with three respective BSs 100a, 100b, 100c. In a given time slot the MS 110 receives TPC commands from each of BSs 100a, 100b, 100c. If the received signals are processed by a Rake receiver having n fingers, it is conventional for each of the n strongest signals to be allocated to a finger.

Figure 4:
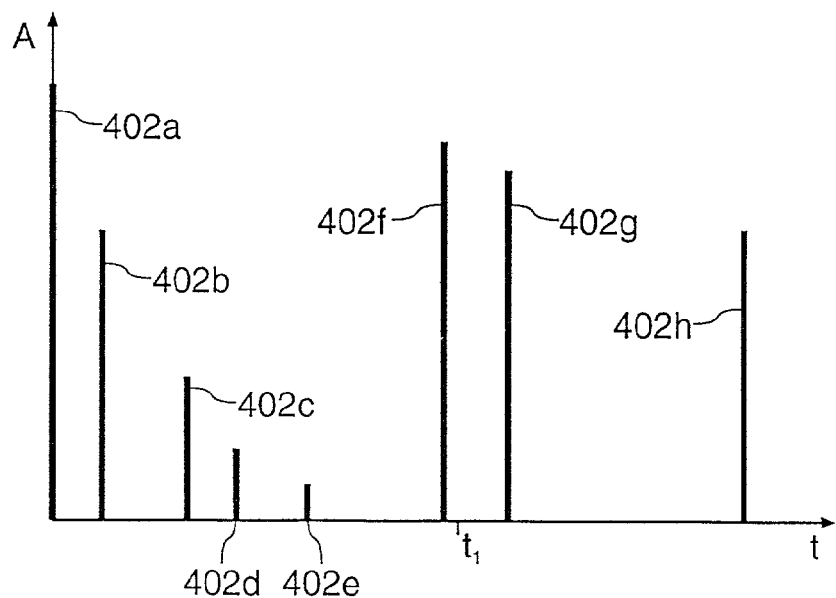
FIG. 4 is a graph showing the amplitude A of received signals against time t from receipt of the first signal.

An example of a set of signals received via different paths is shown in FIG. 4 as a graph of the amplitude A of a plurality of signals 402 against the time of arrival t relative to the time of arrival of the first received signal 402a. If the signals are processed by a six finger Rake receiver, Rake fingers would be allocated to signals 402a, 402b, 402c, 402f, 402g and 402h, while signals 402d and 402e would be ignored.

However, the applicants have determined that such an allocation strategy may not be optimum during soft handover, in view of the limited processing time available. Instead it is proposed, in accordance with the present invention, that Rake fingers are allocated to signals based on time of arrival information, either alone or in combination with signal strength information. This overcomes the situation that a Rake finger is allocated to a signal which has arrived too late to be incorporated in the decision-making process for the next power change, in which case such a finger is effectively wasted.

Hence, in the example shown in FIG. 4, the MS 110 determines that any signals received after time $t_1$ will be too late to be used in determining the next power change. Consequently, the allocation of Rake fingers may be modified from that normally used, as described above, with the fingers being allocated instead to signals 402a, 402b, 402c, 402d, 402e and 402f. This allocation therefore ignores strong late signals (402g,402h), which arrive after a predefined window of arrival for the first significant path. Such late-arriving signals could optionally be used in determining the power control change to be made in a subsequent slot.

The MS 110 may also employ additional techniques, in addition to or instead of the modified allocation of Rake fingers described above, to increase the time available for processing power control commands. One such technique is for the MS 110 to start making its power change on the basis of an initial estimate of the required power change, made before all information from received signals is available. If necessary, the power change could then be corrected based on further received signals. This technique would yield benefits in flexibility for scheduling of processing tasks in the MS 110, provided that a correction to the implemented power change was only required in a small proportion of cases.

In some soft handover situations, for example when a reliable down command is received from the earliest BS 100, there is no need to wait for further power control commands to arrive. In other cases, a suitable strategy might be always to reduce power when a down command, whether reliable or not, is received from the earliest BS 100, and similarly for increasing power in response to an up command subject to the power change being corrected in the event that a reliable down command is received later. Such a strategy would meet the requirements of the UMTS specification.

On occasions when the direction of the power control step did require correction, such correction would be likely to extend beyond the allocated 50 μs period for making power changes. In itself this is not a problem, provided that the average uplink transmission power for the remainder of the slot after the power change is not affected to such an extent that it falls outside permitted tolerances, and provided that the error vector magnitude does not exceed permitted tolerances. The error vector magnitude is defined in UMTS as the root mean square (rms) error vector between the transmitted waveform and a closely-matched reference waveform.

In systems other than UMTS, particularly where information from different BSs 100 during soft handover might affect the required magnitude of the power step, the strategy of starting the power change based on an initial estimate could have greater benefits. For example, the power change could be implemented by means of an initial coarse power change in the RF part of the transceiver 114 with the remaining fine tuning of the transmission power being achieved by adjusting the amplitude of the baseband signals for transmission once the remaining power control commands had been processed.

Another technique is to modify the timings of transmissions from a BS 100. According to the UMTS specification, the MS 110 notifies a BS 100 if the time of arrival of its signals drifts outside a range of typically ±148 chips relative to signals from other BSs 100 (or alternatively relative to a fixed offset from the timing reference for uplink transmissions). The BS 100 can adjust its transmission timing in steps of 256 chips. By reporting a received signal as having arrived outside the acceptable time limit, even if it has not, the MS 110 can arrange the timing of downlink transmissions from a plurality of BSs 100 so as to improve power control command processing. The MS 110 may also decide not to report a weak signal which arrives outside the time limit, for example to avoid any consequent changes to the timing reference.

For example, if the signal from the first-received BS 100 was consistently weaker than the signals from other BSs 100 received later, the MS 110 could report one or more of the stronger, later signals as having arrived late, so that the UMTS network arranged for its timing to be advanced by 256 chips, thereby ensuring that the strongest signal was received first. This algorithm would significantly improve application of the initial estimation method described above.

As an alternative, or in addition, to the above technique, the MS 110 could report as late any downlink signal received more a predetermined amount late, for example 74 chips (i.e. half of the 148 chip timing tolerance), so as to maximise the time available for power control command processing.

Figure 5:
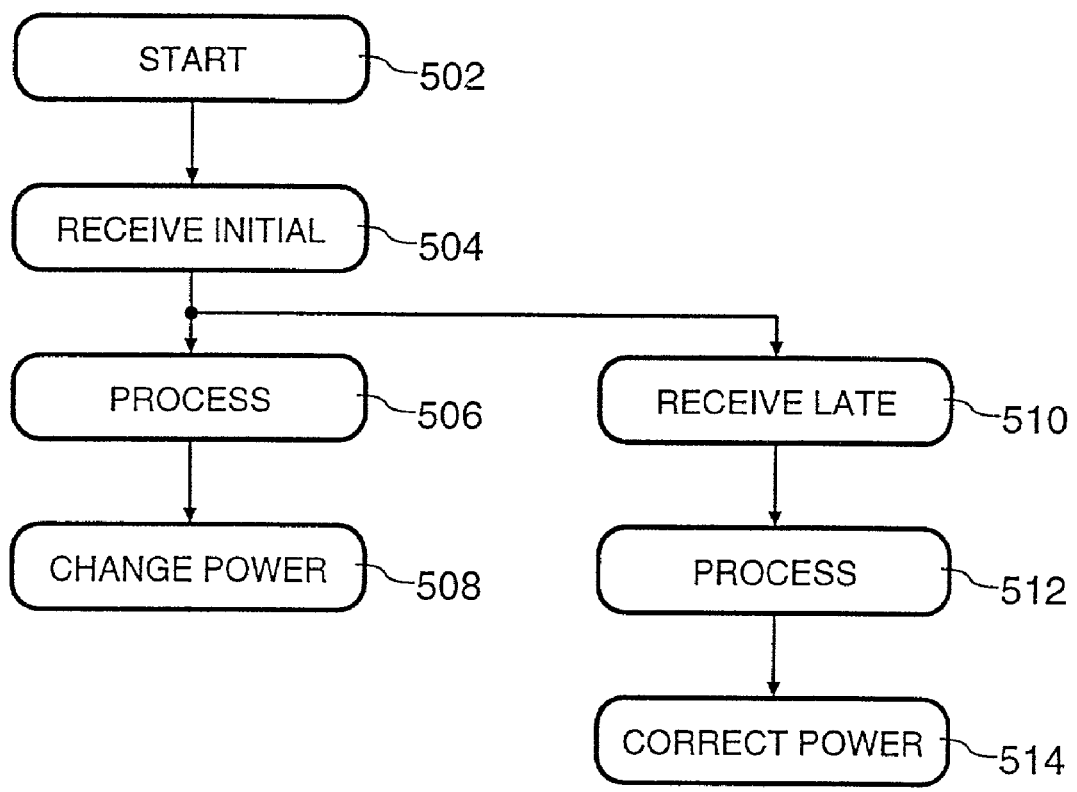
FIG. 5 is a flow chart showing a method of processing multipath signals in accordance with the present invention.

A flow chart illustrating a method in accordance with the present invention of processing multipath signals is shown in FIG. 5. The method starts, at step 502, with a MS 110 beginning a soft handover process. The MS 110 continues, at step 504, to receive an initial subset of the multipath signals from a plurality of BSs 100 until such time as the MS 110 schedules processing of the received signals, at step 506. The processing provides an initial estimate of the required power change, which estimated power change is implemented by the MS 110 at step 508. Multipath signals received, at step 510, after processing of the initial subset are also processed, at step 512. The results of this processing enable the initial estimate of the required power change to be corrected (if necessary), after which the MS 110 corrects its transmission power as required, at step 514.

Although the above description relates to a Rake receiver, it will be apparent that the present invention is equally applicable to any receiver capable of resolving a plurality of multipath signals. Further, although the above description relates to reception of power control commands via a plurality of multipath signals the present invention is also applicable to other transmissions having tight time constraints for decoding. An example of such a transmission is feedback information for controlling transmit diversity of BSs 100 in a UMTS system.

From reading the present disclosure, other modifications will be apparent to persons skilled in the art. Such modifications may involve other features which are already known in the design, manufacture and use of secondary stations and component parts thereof, and which may be used instead of or in addition to features already described herein. It will be appreciated that certain features of the invention which are, for clarity, described in the context of separate embodiments may also be provided in combination in a single embodiment. Conversely, various features of the invention which are, for brevity, described in the context of a single embodiment may also be provided separately or in any suitable subcombination. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A secondary station for use in a radio communication system including at least two primary stations, the secondary station comprising:
    means for engaging in a soft handover process, in which the secondary station communicates simultaneously with the at least two primary stations; and
    receiver means for receiving transmitted signals from the at least two primary stations as a plurality of multipath signals, wherein means are provided for processing a first subset of the multipath signals based on a first predefined window of arrival times to provide an estimate of what action should be taken by the secondary station, and for processing a second subset of the multipath signals based on a second window of arrival times that is greater than the first predefined window of arrival times to update the estimate.

2. The secondary station as claimed in claim 1, further comprising power control means for adjusting a power of uplink transmissions in response to power control commands received from the primary stations; the estimate including a next power change to be implemented by the secondary station.

3. The secondary station as claimed in claim 2, wherein the receiver means includes signal resolution means for resolving the multipath signals, and further comprising means for determining whether each of the multipath signals is received before or after a predetermined time and for allocating to the signal resolution means a weaker signal arriving before the predetermined time in preference to a stronger signal arriving after the predetermined time.

4. A method of operating a secondary station, comprising:
    engaging in a soft handover process, in which the secondary station communicates simultaneously with at least two primary stations;
    receiving transmitted signals from the at least two primary stations as a plurality of multipath signals;
    processing a first subset of the received multipath signals based on a first predefined window of arrival time to provide an initial estimate of what action should be taken by the secondary station; and
    processing a second subset of the multipath signals based on a second window of arrival time that is greater than the first predefined window of arrival time to update the initial estimate.

5. The method as claimed in claim 4, further comprising adjusting a power of uplink transmissions in response to power control commands received from the primary stations, the initial estimate including a next power change to be implemented by the secondary station.

6. The method as claimed in claim 5, wherein the adjusting the power is according to the next power change, and further comprising subsequently correcting the power if the updated estimate differs from the initial estimate.

7. A transceiver comprising:
    a signal generator, and
    a plurality of RAKE fingers, each RAKE finger being configurable to provide an output signal corresponding to an identified path of a plurality of paths of a multi-path signal, and
    a controller that is configured to control a transmit power of the transceiver based on the output signal from the plurality of RAKE fingers,
    wherein the controller provides a first control of the transmit power based on output signals received from one or more of the RAKE fingers during a first predefined window of arrival time, and a subsequent control of the transmit power based on output signals received during a second window of arrival time that is greater than the first predefined window of arrival time.

8. The transceiver of claim 7, wherein the controller is configured to allocate the identified path to each RAKE finger during the first window based on a time of arrival of signals from the plurality of paths.

9. The transceiver of claim 8, wherein
the controller is configured to allocate the identified path to each RAKE finger during the second window based on a relative strength of signals from the plurality of paths.

10. The transceiver of claim 7, wherein
the controller is configured to provide the first control based on a first occurring output signal from the plurality of RAKE fingers.

11. The transceiver of claim 7, wherein
the controller is configured to provide the first control and subsequent control based on amplitudes of the output signals received during the first and second windows of arrival time, respectively.

12. The transceiver of claim 7, wherein
the output signal from each of the one or more RAKE fingers is configured to indicate a request from a corresponding base station to increase or decrease the transmit power.

13. The transceiver of claim 12, wherein
the controller is configured to determine whether to increase or decrease the transmit power via the first control based on a select one of the output signals received during the first time window, and whether to increase or decrease the transmit power via the subsequent control based on a plurality of the output signals received during the second time window.

14. The transceiver of claim 7, wherein
the controller is configured to:
provide the first control based on a select one of the output signals received during the first time window, and
provide the subsequent control based on a plurality of the output signals received during the second time window.

15. The transceiver of claim 7, wherein
each output signal corresponds to a signal transmitted from a corresponding base station of a plurality of base stations, and
the controller is configured to communicate a request to a select base station to adjust a transmit time from the select base station, to facilitate receipt of the signal transmitted from the select base station during the first predefined window of arrival time.

16. The transceiver of claim 15, wherein
the controller is configured to select the select base station based on a strength of a received signal corresponding to the select base station.

17. The transceiver of claim 16, wherein
the received signal is received after the first window of arrival time, and within the second window.

* * * * *